United States Patent [19]

Angersbach et al.

[11] 4,183,312
[45] Jan. 15, 1980

[54] SPEED-REGULATED SEWING MACHINE

[75] Inventors: Wolfgang Angersbach, Darmstadt; Jürgen Scharffetter, Riedstadt, both of Fed. Rep. of Germany

[73] Assignee: Quick-Rotan Becker & Notz KG, Darmstadt, Fed. Rep. of Germany

[21] Appl. No.: 967,735

[22] Filed: Dec. 8, 1978

[30] Foreign Application Priority Data

Dec. 10, 1977 [DE] Fed. Rep. of Germany ....... 2755235

[51] Int. Cl.² ............................................. D05B 69/18
[52] U.S. Cl. .................................... 112/277; 112/220; 318/328; 192/12 D; 192/103 R
[58] Field of Search ................ 112/277, 275, 220, 221; 318/302, 328; 192/12 D, 18 B, 103 R

[56] References Cited

U.S. PATENT DOCUMENTS

| 3,599,764 | 8/1971 | Daab et al. | 192/103 R X |
| 3,972,297 | 8/1976 | Melcharick | 112/275 |

Primary Examiner—Peter P. Nerbun
Attorney, Agent, or Firm—Striker, Michael J.

[57] ABSTRACT

A sewing machine has a main drive shaft to which is drivingly coupled the output member of a coupling motor unit, the latter including an electric motor having a constantly rotating output shaft, a braking structure, and electrically controlled electromagnets for causing the output member to engage and become disengaged from the output shaft and the braking structure to increase and decrease the rpm of the main drive shaft of the machine. An rpm regulator has first and second inputs for receipt of a desired-rpm command signal and an actual-rpm feedback signal. The actual-rpm feedback signal is generated using a pole wheel rotating synchronously with the sewing-machine drive shaft and a plurality of pick-up transducers spaced along the pole-wheel periphery. During pole-wheel rotation, an A.C. voltage is induced in each such pick-up transducer. The spacing of the transducers relative to the spacing of the poles of the pole wheel is such that these induced voltages are phase-shifted relative to one another. Each transducer output voltage is applied to a respective rectifier. The rectified, pulsating output voltages from the plural rectifiers are algebraically summed, without the use of smoothing capacitors, to form a relatively smooth D.C. voltage which is suitable for use as the actual-rpm feedback signal of the system.

10 Claims, 5 Drawing Figures

SPEED-REGULATED SEWING MACHINE

BACKGROUND OF THE INVENTION

The present invention relates to speed-regulated sewing-machine drive systems of the type provided with a coupling, or coupling and braking, motor unit having an output drive member coupled in driving relationship to the main drive shaft of the sewing machine. An electromagnetically controlled friction coupling serves to couple the output drive member to the continuously rotating output shaft of the electric motor of the motor unit, and to decouple it therefrom, and also, if a coupling and braking motor unit is involved, to couple the output drive member to a brake and to decouple it therefrom. The electromagnetically controlled friction coupling is energized and deenergized by a negative-feedback regulator which compares a feedback voltage indicating the present rpm of the sewing machine against a command voltage indicating the manually or automatically selected rpm of the sewing machine, and in dependence upon the magnitude and/or polarity of the discrepancy between the two, causes the output drive member to become frictionally coupled to the constantly rotating drive shaft, or decoupled therefrom, or coupled to the brake of the unit, or decoupled therefrom. The feedback voltage is generated by a magnetic pole wheel driven in synchronism with rotation of the sewing-machine drive shaft, and is provided about its periphery with uniformly spaced circumferentially successive inductive elements, e.g., permanently magnetized portions, or permanent magnets, or projections or recesses in its unmagnetized ferromagnetic material, these successive inductive elements cooperating with inductive transducers distributed along the circumference of the pole wheel, with the voltage waveforms produced by each individual one of the plural inductive transducers being, in one way or another, combined together to form a voltage from which the feedback or actual-rpm voltage needed by the regulator can be derived.

An arrangement meeting the above description is known from Federal Republic of Germany published patent application DT-OS No. 2,134,751 in conjunction with U.S. Pat. No. 3,599,764. There, three inductive transducers are circumferentially spaced, one from the next, a distance of 120° and their respective coils, in which in-phase voltages are induced, are connected together in series or in parallel. The thusly connected together inductive transducers produce at their combined output an A.C. voltage constituting the average value of the voltages furnished by the individual transducers individually, the amplitude of the A.C. output voltage being proportional to the rpm of the sewing machine, and its frequency being equal to the number of rotations or operating cycles performed by the sewing machine per second multiplied by the number of pole pairs of the magnetic pole wheel. Before this rpm-indicating voltage can be applied to a comparator or subtractor to generate an rpm-correction or actuating signal, this A.C. voltage must be rectified and then passed through a smoothing circuit. This requires additional circuit elements, and in particular the smoothing circuit requires space-consuming and in general undesirable smoothing capacitors.

SUMMARY OF THE INVENTION

It is accordingly a main object of the present invention to provide an improved sewing-machine drive system of the type referred to above, in which the rpm-indicating output voltage produced by the inductive transducers mentioned is made suitable for application to a servo comparator or subtractor by considerably simpler means, not relying on the use of smoothing capacitors.

In accordance with the present invention, this is achieved by so spacing the inductive transducers one from the next and relative to the poles of the magnetic pole wheel that the voltages induced in the plural inductive transducers are not in-phase as with the system referred to above but instead mutually phase-shifted. Furthermore, each inductive transducer is provided with a respective separate rectifier rectifying the voltage induced in it to produce a respective pulsating output voltage, and then the plural pulsating rectifier-stage output voltages are combined together to form a summed voltage suitable for application to a servo comparator or subtractor.

Using this technique, it becomes possible to develop, without the need for smoothing capacitors, a relatively smooth or flat D.C. voltage whose amplitude corresponds to the rpm of the sewing machine. The avoidance of smoothing capacitors, besides being space-saving and economically desirable, can reduce the time-constant characterizing the negative-feedback speed control of the sewing-machine drive system. Furthermore, in the gaps or low-magnitude intervals of each individual rectifier-stage pulsating output voltage, there occur one or more additional real-time (e.g., not merely time-delayed) signals from the other inductive transducer(s), so that even if the sewing machine is operating at low speed there is no possibility that the current energizing the clutch and/or brake of the drive system will intermittently and improperly go to zero. A high and relatively uniform drive torque continues to be achieved.

Preferably, the inductive transducers are so spaced from one another relative to the poles of the pole wheel that the phases of the voltages induced in the individual transducers differ by about 180°/n, wherein n is the number of transducers employed. This assures that the component voltages which are to be combined to form the sum signal in question are uniformly related with respect to time and therefore maximize the smoothing effect which the inventive technique affords.

To still further improve the effectiveness of the smoothing effect provided by the inventive technique, it is preferred that the rectifier stages each comprise a full-wave bridge rectifier, each bridge rectifier having two diagonally opposite terminals together constituting the rectifier input and connected across the output of the respective transducer, with the remaining two terminals constituting the rectifier output.

The smoothing action achieved is particularly effective if the outputs of the individual rectifier stages are all connected together in parallel.

The inductive transducers are most preferably inductor coils provided with iron cores and salient poles. The pole wheel is preferably a ring of ferromagnetic material provided with a circumferential succession of actually magnetized poles.

The structure and circuit elements needed to generate the actual-rpm signal to be supplied to the servo comparator is accordingly light in weight and consumes very little space. As a result, it becomes possible to locate the pole wheel on the shaft of the position transducer of the sewing-machine control system, the position transducer being coupled to the machine's handwheel, and the rectifiers can be conveniently located on a circuit plate within the interior of the position-transducer housing, and all this without excessive load being applied to the sewing machine drive shaft.

Preferably, the pick-up transducers are mounted adjustable in the direction radially of the rotating pole wheel. This makes it simple to adjust these transducers individually towards and away from the pole wheel, to assure that at a predetermined speed the peak amplitude of each associated A.C. voltage produced will all be identical in value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
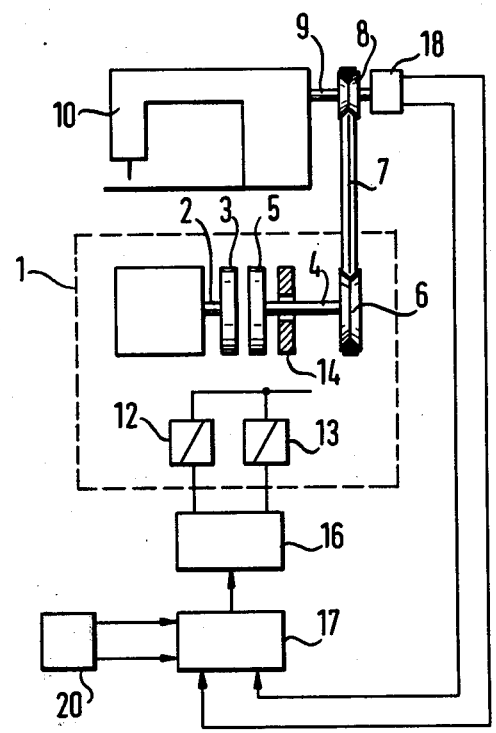
FIG. 1 is a schematic block diagram of the type of rpm- and position-regulating control system within which the present invention finds its use.

In FIG. 1, numeral 1 denotes in toto a coupling motor unit, which here happens to be a coupling and brake motor unit. The coupling motor unit 1 includes an electric motor having a constantly rotating output shaft 2 provided with a flywheel 3. The output shaft 4 of motor unit 1 is provided at its left end with a friction clutch disk 5 frictionally engageable with flywheel 3 and at its right end with a belt drive wheel 6 constituting the output drive member of coupling motor unit 1. Drive wheel 6 is coupled by means of a V-cross-section belt 7 to the handwheel 8 on the main drive shaft 9 of a sewing machine 10. When a clutch winding 12 is energized, clutch disk 5 is moved into frictional engagement with flywheel 3. When a brake winding 13 is energized, clutch disk 5 is pressed against a non-rotating frictional braking surface 14. It will be understood that clutch disk 5 can in per se conventional manner be divided into parts, e.g., in the manner of U.S. Pat. No. 3,945,476.

The energization of windings 12, 13 is controlled by a negative-feedback rpm regulator 16 provided with a comparator 17. Comparator 17 receives actual-value or feedback signals indicating actual sewing-machine rpm and actual sewing-machine position from a combined rpm- and position-measuring transducer unit 18 coupled to the machine's handwheel 8, and receives desired-rpm signals for negative-feedback speed regulation and desired-position signals for high-precision stopping of the sewing machine, from a command signal unit 20.

Figure 2:
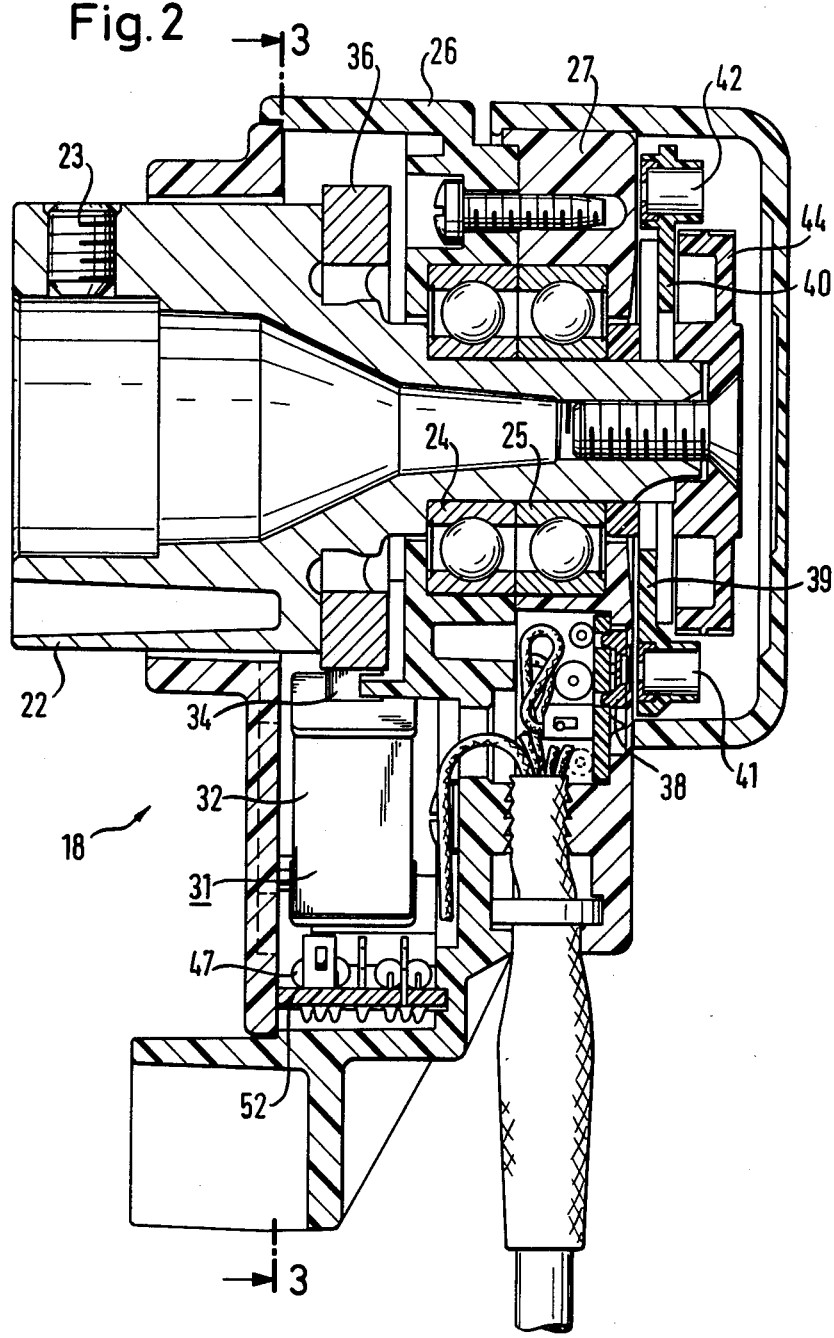
FIG. 2 is a longitudinal section through a unit serving to generate both the actual-rpm signal needed for negative-feedback rpm regulation and the position-feedback signals needed for position regulation in the control system.
Figure 3:
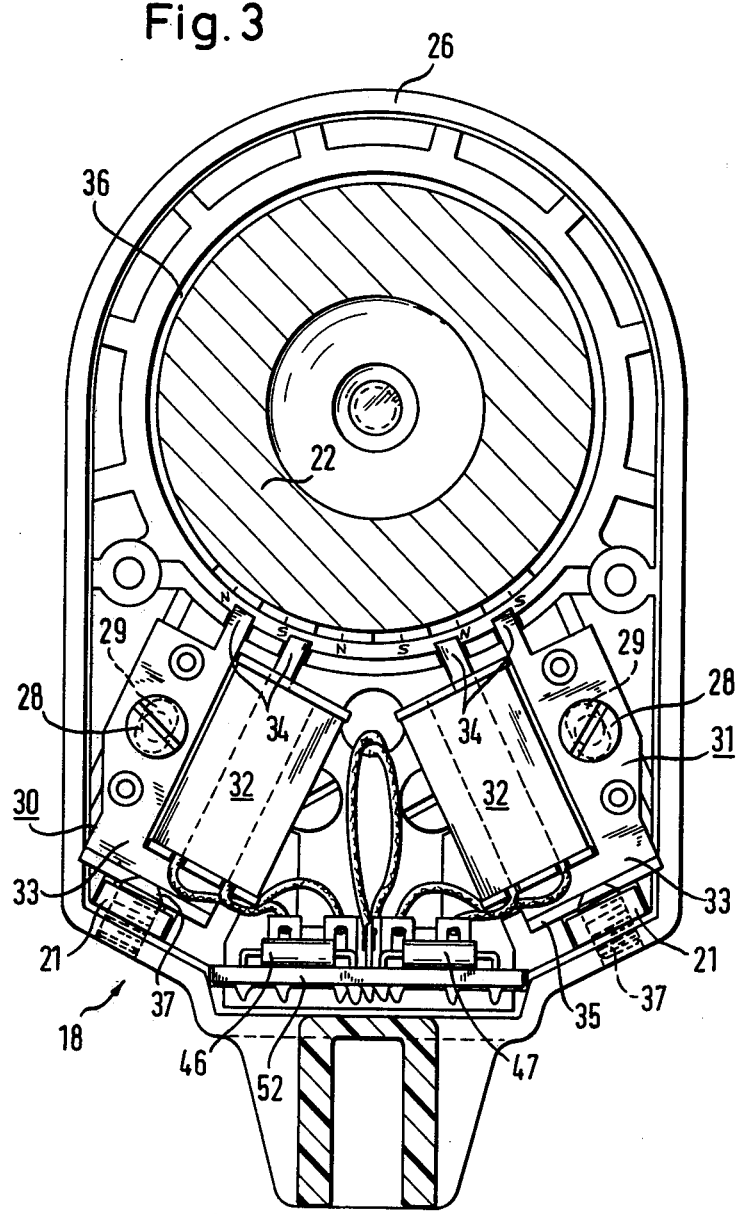
FIG. 3 is a section taken along line 3—3 of FIG. 2.

The unit 18 of FIG. 1 is shown in detail in FIGS. 2 and 3. Unit 18 comprises a shaft-accommodating rotary structure 22 which can be pushed onto the end of machine drive shaft 9 and held in place by means of a set screw 23. The right or smaller-diameter end of shaft-accommodating structure 22, as seen in FIG. 2, is mounted in ball bearings 24, 25 whose outer races are stationary and seated in stationary parts 26, 27 of the housing of the speed and position feedback transducer unit 18. Mounted on housing part 26 are two pick-up transducers 30, 31, in this embodiment comprised of inductor coils 32 with iron cores 33 and salient poles 34. The pick-up transducers 30, 31 cooperate with a pole wheel 36 provided on, and preferably cemented to the rotary shaft-accommodating structure 22. In this embodiment, pole wheel 36 has the form of a one-piece ferromagnetic ring which is permanently magnetized in the radial direction and has circumferentially successive sectors of alternate or opposite magnetic polarity; i.e., as shown in FIG. 3, the successive sectors of pole-wheel ring 36 have radially outer poles which are alternately N, S, N, etc., proceeding circumferentially. For example, the pole wheel 36 can be provided with twenty-four such poles or permanently magnetized angular sectors, all of equal breadth, only a few being indicated in FIG. 3. In the embodiment depicted in FIGS. 2 and 3, the pick-up transducers 30, 31 are so circumferentially spaced from each other with regard to the poles N, S that the voltages induced in the individual transducers 30, 31 exhibit a 90° phase shift relative to each other.

The pick-up transducers 30, 31 are mounted on housing part 26 by means of screws 28 which extend through elongated apertures 29 in the respective iron cores 33. The legs 35 of the iron cores 33 are pressed against by adjusting screws 37 accommodated in threaded bushings 21 of housing part 26. The screws 28 and 37 make it possible to adjust the positions of the pick-up transducers 30, 31 in the direction radially of pole wheel 36.

Housing part 27, in particular, accommodates the position-feedback-signal generator structure of the feedback transducer unit 18, mainly comprised of a Hall generator 38 mounted stationary on the housing and two magnet carriers 39, 40. The magnet carriers 39, 40 accommodate respective magnets 41, 42, both of which are located the same radial distance from the rotation axis of structure 22 as is the Hall generator 38. A clamping structure 44 mounts the magnet carriers 39, 40 on the rotary shaft-accommodating structure 22, but adjustable in their angular positions relative thereto. Position feedback transducers of this type are known (see, e.g., U.S. Pat. No. 3,582,739) and therefore should require no further explanation here.

Figure 4:
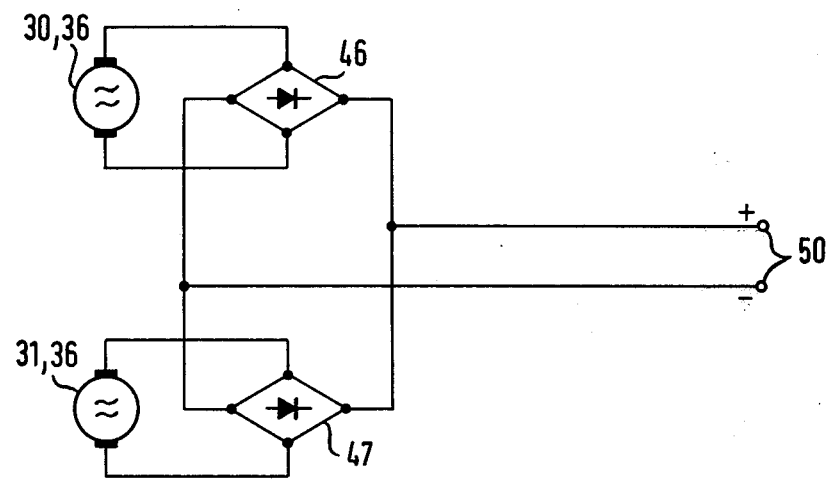
FIG. 4 is a circuit diagram indicating how the A.C. output voltages of the plural pick-up transducers are rectified, and the individually rectified output voltages combined to form the requisite actual-rpm signal for the system.
Figure 5:
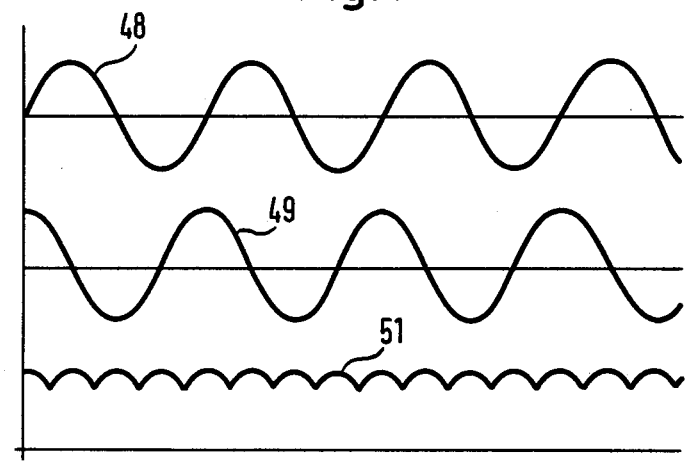
FIG. 5 depicts the output voltage waveforms from the two rectifiers of FIG. 4 considered individually and the output voltage waveform resulting from these two output waveforms are combined in the manner shown in FIG. 4.

FIG. 4 schematically depicts the circuitry producing the required actual-rpm feedback voltage needed by the comparator of the speed-regulating system. Pole wheel 36 and first pick-up transducer 30 cooperate to produce a first A.C. output voltage, and are accordingly shown in FIG. 4 as an A.C. generator. Likewise, pole wheel 36 and second pick-up transducer 31 are shown as a second A.C. generator. The A.C. output voltage of each such A.C. generator 30, 36; 31, 36 is applied across the two diagonally opposite input terminals of a respective four-diode full-wave bridge rectifier 46 or 47. The output voltages of the two A.C. generators are shown in FIG. 5, and as available at the diagonally opposite output terminals of the respective bridge rectifiers 46, 47 are full-wave rectified and phase-shifted relative to each other. In FIG. 5, the two A.C. output waveforms 48, 49 are shown to be of equal amplitude, and the adjustment assuring this is discussed below. The outputs of the two bridge rectifiers 46, 47 are connected in parallel, i.e., one output terminal of the first is connected to the corresponding output terminal of the second, and the other output terminal of the first is connected to the other output terminal of the second. As a result, there appears at the output 50 of the actual-rpm feedback transducer a sum-voltage waveform 51 as shown in FIG. 5. This output voltage is, first of all, D.C. and is relatively smooth, i.e., its ripple is relatively low compared to its average magnitude. Output voltage 51 is smooth enough to be applied, without transmission through a smoothing filter, to the servo comparator 17 of the speed-control system of FIG. 1. The two bridge rectifiers 46, 47 themselves are mounted on a circuit plate 52 (FIGS. 2 and 3) within the housing 26, 27 of the rpm and position feedback transducer unit 18.

The adjusting screws 28 and 37 shown in FIG. 3 make it possible to easily adjust the radial distances of the poles 34 of the pick-up transducers 30, 31 with respect to the pole wheel 36, so that the amplitudes of the A.C. output voltages of the two transducers can be individually adjusted until they equal each other, for the sake of the most uniform possible rpm-indicating voltage 51.

It will be understood that a greater number of transducers could be provided, in order to further increase the smoothness of the rpm-indicating voltage waveform 51. In that case, the additional bridge rectifiers could be connected at their outputs in parallel to the outputs of rectifiers 46, 47, i.e., in the same way that the outputs of rectifiers 46, 47 are connected in parallel to each other. Preferably, the circumferential spacing among the pick-up transducers, whatever the number n of them used, is such that the voltages induced in them are phase-shifted relative to one another by amounts of about 180°/n. In the illustrated embodiment n=2, and as already stated the voltages induced in the two transducers 31, 32 are phase-shifted relative to each other by 90°.

It will be understood that each of the elements described above, or two or more together, may also find a useful application in other types of constructions and circuits differing from the types described above.

While the invention has been illustrated and described as embodied in a particular sewing-machine rpm- and position-control system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a sewing machine having a main drive shaft, an improved rpm-regulated drive system, the drive system being of the type which comprises a coupling motor unit which includes an output drive member drivingly coupled to the sewing-machine drive shaft, an electric motor having a constantly rotating output shaft, a braking structure, and electrically controlled electromagnet means for causing the output drive member to engage and become disengaged from the output shaft and the braking structure in order to increase and decrease the rotary speed of the output drive member and thereby of the main drive shaft of the sewing machine;

regulating means having an output connected to and controlling the electromagnet means and having a first input for receipt of a desired-rpm command signal and a second input for receipt of an actual-rpm feedback signal;

and actual-rpm feedback transducer means, including a pole wheel rotating synchronously with the sewing-machine drive shaft, the pole wheel having a circumferential succession of transducer-detectable induction-modifying elements, a plurality of inductive pick-up transducers arranged along the periphery of the pole wheel and each responding to passage of the succession of induction-modifying elements by producing an A.C. output voltage whose amplitude is proportional to the rpm of the pole wheel, and connecting means connecting together the outputs of the plurality of inductive pick-up transducers to form a voltage constituting said actual-rpm feedback signal, the improvement wherein the inductive pick-up transducers are so spaced relative to the circumferential spacing of the induction-modifying elements of the pole wheel that the individual A.C. voltages induced in the individual pick-up transducers are phase-shifted relative to one another, said connecting means comprising a plurality of rectifiers, one for each inductive pick-up transducer, each rectifying the output voltage of the respective transducer to form a respective pulsating rectifier output signal and means connecting together the outputs of the plurality of rectifiers and connecting them to said second input of the regulating means and operative for applying to the latter a sum signal which constitutes said actual-rpm feedback signal and is derived from the pulsating rectifier output signals by summation alone.

2. The drive system defined in claim 1, the inductive pick-up transducers being so spaced relative to the circumferential spacing of the induction-modifying elements of the pole wheel that the individual A.C. voltages induced in the individual pick-up transducers differ from one another in phase shift by about 180°/n, wherein n is the number of such pick-up transducers contributing to said actual-rpm feedback signal.

3. The drive system defined in claim 1, each rectifier being a full-wave bridge rectifier.

4. The drive system defined in claim 1, the outputs of the plurality of rectifiers being joined together in common.

5. The drive system defined in claim 3, each full-wave bridge rectifier having two output terminals, the first output terminals of all the rectifiers being connected in common, the second output terminals of all the rectifiers being connected in common.

6. The drive system defined in claim 1, each inductive pick-up transducer comprising an inductor coil and having an iron core provided with salient poles.

7. The drive system defined in claim 1, the pole wheel comprising a ring of permanently magnetized material having a circumferential succession of alternately polarized magnetized sectors.

8. The drive system defined in claim 1, the sewing machine including a handwheel on the main drive shaft, the drive system furthermore including a shaft position transducer structure comprising a stationary part and a rotating part coupled to and rotating with the handwheel, the pole wheel being mounted on the rotating part of the shaft position transducer structure.

9. The drive system defined in claim 8, the shaft position transducer structure including a housing which accommodates the rotating part of the shaft position transducer structure, the rectifiers being mounted on a circuit plate located interiorly to the housing of the shaft position transducer structure.

10. The drive system defined in claim 1, furthermore including adjusting means for moving the individual pick-up transducers towards and away from the pole wheel in the radial direction of the pole wheel, whereby to make it possible to equalize the amplitudes of the A.C. voltages produced by the individual pick-up transducers.

* * * * *